United States Patent [19]

Abe et al.

[11] 4,002,840
[45] Jan. 11, 1977

[54] ANGLE-MODULATED SIGNAL TRANSMISSION SYSTEM

[75] Inventors: Tadashi Abe, Hirakata; Yukinobu Ishigaki, Yamato, both of Japan

[73] Assignees: Matsushita Electric Industrial Co., Ltd., Kadoma; Victor Company of Japan, Ltd., Yokohama, both of Japan

[22] Filed: June 24, 1975

[21] Appl. No.: 589,750

[30] Foreign Application Priority Data

June 25, 1974 Japan .................... 49-71879
Jan. 30, 1975 Japan .................... 50-13061

[52] U.S. Cl. ............... 179/15 BT; 179/100.1 TD; 179/100.4 ST; 179/1 GQ
[51] Int. Cl.² .................................. H04R 5/00
[58] Field of Search ........... 179/1 GQ, 15 BT, 1 G, 179/100.1 TD, 100.4 ST; 325/36, 47

[56] References Cited
UNITED STATES PATENTS

| | | | |
|---|---|---|---|
| 3,686,471 | 8/1972 | Takahashi | 179/15 BT |
| 3,732,375 | 5/1973 | Kuribayashi | 179/15 BT |
| 3,803,367 | 4/1974 | Takahashi | 179/15 BT |
| 3,839,602 | 10/1974 | Takahashi | 179/1 GQ |
| 3,896,271 | 7/1975 | Ishigaki et al. | 179/1 GQ |

*Primary Examiner* — Douglas W. Olms

[57] ABSTRACT

An angle-modulated signal transmission system comprises first and second filters for filtering signal components from first and second modulation signals supplied thereto. The filters eliminate a certain frequency band which tends to cause interference distortion in transmitted and demodulated signals due to crosstalk produced between first and second angle-modulated signal transmission paths. A mixer mixes the output signals of the first and second filters, with a certain mixing ratio. First and second adders add the signal components of a certain frequency band of the first and second modulation signals, thus mixed and processed by the mixer and the signal components of a frequency band other than the certain band of the first and second modulation signals. First and second angle modulators modulate carriers responsive to the resulting output signals of the first and second adders and send the output angle-modulated signals thereof respectively to the transmission paths.

9 Claims, 8 Drawing Figures

FIG. 6

ANGLE-MODULATED SIGNAL TRANSMISSION SYSTEM

BACKGROUND OF THE INVENTION

The present invention relates generally to angle-modulated signal transmission systems, More particularly, the invention relates to a system for transmitting a plurality of angle-modulated signals through respective transmission paths and having means for eliminating substantially all interference distortion due to crosstalk between the transmission paths.

In general, there is interference distortion responsive to crosstalk between a plurality of transmission paths for respectively transmitting angle-modulated signals. This interference distortion arises in the demodulated signals.

An example of a system having a plurality of transmission paths for transmitting the above mentioned angle-modulated signals is the 4-channel record disc recording and reproducing system previously described in U.S. Pat. Nos. 3,686,471 and 3,883,699. In the recording part of this 4-channel record disc recording and reproducing system, the signals of two pairs of channels are matrixed thereby to obtain respective sum and difference signals. A carrier wave is then angle modulated with each difference signal. The resulting angle-modulated difference signal is multiplexed with a direct wave sum signal. The resulting multiplexed signal being recorded on a record disc by a cutter head.

In the reproducing system part of the 4-channel, the recorded multiplexed signal is reproduced from the record disc by a pickup cartridge. After the angle-modulated difference signals have been demodulated, the demodulated difference signals and the direct wave sum signals are used to recover the four original channel signals.

In this recording and reproducing system, crosstalk is apt to occur between the angle-modulated difference signals, particularly at the time of cutting and recording with the cutter head and at the time of reproducing with the pickup cartridge. With respect to this crosstalk due to the cutter head, by providing a crosstalk canceling circuit in the recording system. However, it has heretofore been difficult to cancel crosstalk due to the pickup cartridge because the characteristics of the pickup cartridges, used in the reproducing system, differ from cartridge to cartridge.

Heretofore, an attempt has been made to reduce the interference distortion arising from crosstalk in the reproducing system, by recording with a reduced level of signals in the low frequency band, which is angle-modulated with large modulation index. However, the low level of the low frequency range component has an important function with respect to so-called volume sensation in reproduced sound. The reproduced sound field becomes deficient in this sound volume sensation.

A study measures the relationship between (a) interference distortion and the phase difference between the two angle-modulated signals and (b) interference distortion and the amplitude ratios of the two angle-modulated signals. It was found that, irrespective of the characteristic of the pickup cartridge, each interference distortion becomes a minimum when the phase difference between the two angle-modulated signals is zero, and the amplitude ratio of the two angle-modulated signal is one (unity).

This result is indicated also by the following equations. By denoting two modulation signals by Ma and Mb, the crosstalk coefficient between angle-modulated transmission paths by K, the efficiency of angle signal modulation and demodulation by $\alpha$, and the demodulation signal by E, the following equation is obtained.

$$E = \alpha \left( Ma + \sum_{n=1}^{\infty} \frac{(-1)^{n-1} K^n}{n} \sin n(Mb - Ma) \right)$$

Here, the first term on the right-hand side is a demodulation signal with respect to the desired modulation signal. The second term is an interference distortion signal component created by crosstalk. When $n = 1$ in the second term, the interference distortion quantity Ed becomes:

$$Ed \approx \alpha K \sin (Mb - Ma)$$

It can be seen, therefore, that the distortion quantity Ed is very small, becoming zero in the ideal case, where the difference between the modulation signals $(Mb - Ma)$ is very small, or ideally zero, that is, when the phases and amplitudes of the two modulation signals are respectively equal.

SUMMARY OF THE INVENTION

In accordance with the present invention, the above described problems are overcome by causing the phase difference between the two angle-modulated signals to be zero and by causing the amplitude ratio to be one (unity) with respect to the component of the band which angle modulates a carrier with large modulation index and which imparts a great influence on the interference distortion.

A general object of the invention is to provide an angle-modulated signal transmission system by which angle-modulated signals can be transmitted with substantially no interference distortion due to crosstalk. The above described difficulties, encountered in the prior art, are thus overcome.

Another and specific object of the invention is to provide a system in which each of two frequency components, conducive to the interference distortion, are mixed with a certain mixing ratio. The resulting angle-modulated signals are thus transmitted. The phase difference and the amplitude ratio between the two angle-modulated signals are respectively held substantially at zero and substantially at one (unity) with respect to the above mentioned frequency components. The interference distortion can thus be suppressed.

Still another object of the invention is to provide an angle-modulated signal transmission system in which the amplitude ratio can be automatically controlled, during the above mentioned mixing.

A further object of the invention is to provide an angle-modulated signal transmission system in which the bands of the frequency components can be automatically controlled during the above mentioned mixing.

Further objects and features of the invention will be apparent from the following detailed description when read in conjunction with the accompanying drawings.

DETAILED DESCRIPTION

Figure 1:
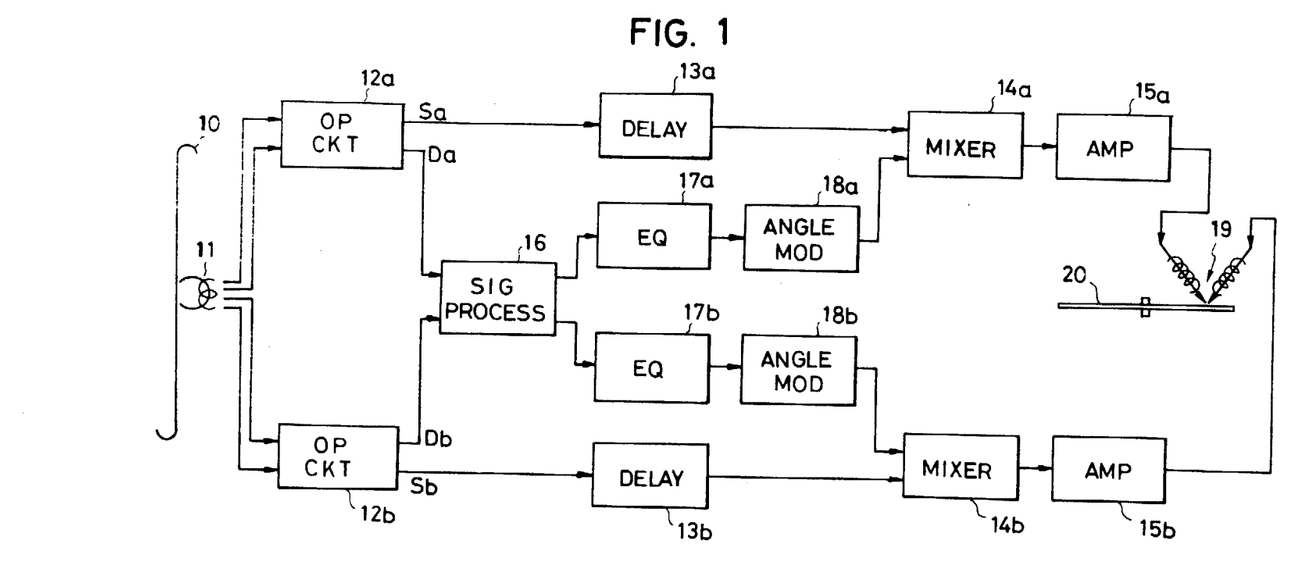
FIG. 1 is a general block diagram showing one embodiment of a multichannel record disc recording system using the inventive angle-modulated signal transmission system.

FIG. 1 shows one embodiment of a 4-channel record disc recording system, in which the angle-modulated signal transmission system of the invention is incorporated. Signals CH1, CH2, CH3, and CH4, of first through fourth channels, are recorded on four tracks of a magnetic tape 10, and are reproduced by a reproducing head block 11.

The first and second channel signals CH1 and CH2 thus reproduced, are fed to an operation circuit 12a. The third and fourth channel signals CH3 and CH4, thus reproduced, are fed to an operation circuit 12b. The four channel signals are respectively operated to produce sum and difference signals.

The output sum signal Sa (resulting from CH1 + CH2) of the operation circuit 12a is fed through a delay circuit 13a to a mixer 14a. The output difference signal Da (resulting from CH1 − CH2) of the same circuit 12a is fed to a signal processing circuit 16. Similarly, the output sum signal Sb (resulting from CH3 + CH4) of the operation circuit 12b is fed through a delay circuit 13b to a mixer 14b. The output difference signal Db (resulting from CH3 − CH4) of the same circuit 12b is fed to the above mentioned signal processing circuit 16.

The difference signals Da and Db thus supplied to the signal processing circuit 16 undergo signal processing. Their respective low-frequency band components are mutually and crosswisely mixed with each other, as described hereinafter. The resulting output difference signals of the signal processing circuit 16 are respectively passed through FM/PM equalizers 17a and 17b. Then, these signals angle modulate carriers at angle modulators 18a and 18b. The resulting angle-modulated difference signals are respectively supplied to the above mentioned mixers 14a and 14b. There they are mixed and multiplexed respectively with the direct wave sum signals Sa and Sb supplied through the delay circuits 13a and 13b. The resulting multiplexed signals from the mixers 14a and 14b are respectively amplified by amplifiers 15a and 15b. Thereafter, they are respectively supplied to the left and right channel driving coils of a cutter head 19, and are cut and recorded respectively on the left and right walls of the same groove on a record disc 20.

Figure 2:
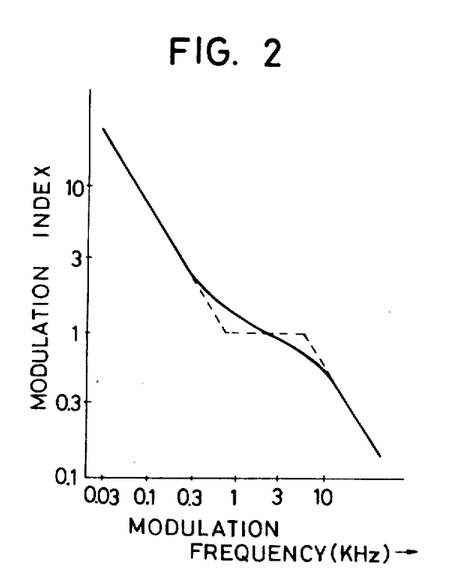
FIG. 2 is a graph indicating the relationship between modulation index and modulation frequency of an angle-modulated signal.

In the operation outlined above, the above mentioned angle modulators 18a and 18b accomplish angle modulation responsive to the difference signals, as modulation signals, with a modulation index characteristic as indicated in FIG. 2 relative to the modulation signal frequency. Interference distortion is created with higher modulation index. The signal components of the low-frequency bands (for example, 0 to 500 Hz), respectively, of the two difference signals Da and Db, are derived and mutually added to each other in the above mentioned signal processing circuit 16.

It may be thought that the mutual adding of signals between two angle-modulated signals will lead to a loss of the independent characters of the angle-modulated signals and to a deleterious influence on the sound image localization in the reproduced sund field. However, a signal component of a low-frequency band does not have very great importance with respect to the sound image localization in the reproduced sound field. There is almost no impairment of the sound image localization when the low-frequency band signal components are mutually added to each other, with the aim of reducing the interference distortion as described above.

Figure 3:
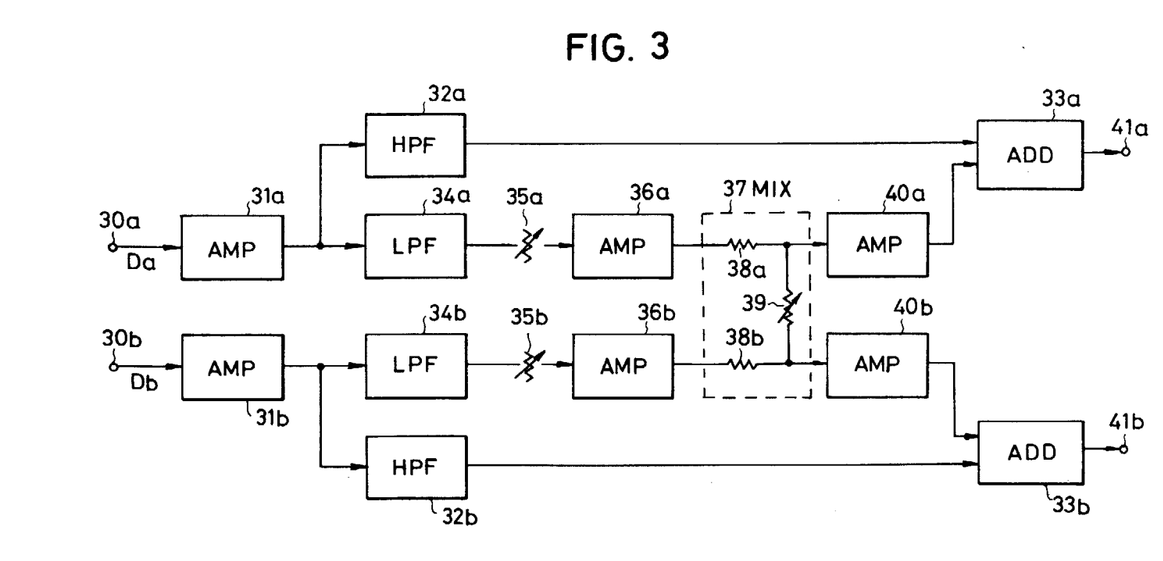
FIG. 3 is a block diagram showing a first embodiment of a signal processing circuit portion for of the system illustrated in FIG. 1.

One embodiment of the above mentioned signal processing circuit 16 is illustrated in FIG. 3. The difference signals Da and Db are supplied from the operation circuits 12a and 12b and enter through input terminals 30a and 30b, respectively. They pass through amplifiers 31a and 31b and thereafter are respectively supplied to a high-pass filter 32a and a low-pass filter 34a and to a high-pass filter 32b and a low-pass filter 34b. The high-frequency band of components of the difference signals Da and Db are filtered out respectively by the high-pass filters 32a and 32b and sent to adders 33a and 33b. The low-frequency band of components of the difference signals Da and Db are filtered out respectively by the low-pass filters 34a and 34b and respectively passed through level adjusters 35a and 35b and amplifiers 36a and 36b. Thereafter, they are supplied to a mixer 37. In this connection, the filtering frequency band characteristics of the high-pass filter 32a (32b) and the low-pass filter 34a (34b) are so selected that, when their output signals are added together, the signal resulting from this addition is equal to the input signal.

The above mentioned mixer 37 comprises resistors 38a and 38b with a variable resistor 39 connected between their output sides. After it has passed through the resistor 38a, the low-frequency band of components of the difference signal Da is fed to an amplifier 40a and, at the same time, is fed by way of the variable resistor 39 to an amplifier 40b. Similarly, after it has passed through the resistor 38b, the low-frequency band of components of the difference signal Db is fed to the amplifier 40b and, at the same time, is fed by way of the variable resistor 39 to the amplifier 40a.

Accordingly, a signal resulting from the mixing of the difference signal Da with the difference signal Db is obtained with a specific mixing ratio as output from the amplifier 40a. From there, it is supplied to the adder 33a to be added to the high-frequency band component of the difference signal Da from the above mentioned high-pass filter 32a. Similarly, a signal resulting from the mixing of the difference signal Db with the difference signal Da is obtained with a specific mixing ratio, as output from the amplifier 40b. From there, it is supplied to the adder 33b to be added to the high-frequency band component of the difference signal Db from the above mentioned high-pass filter 32b.

Thus, a signal resulting from the addition of the low-frequency band of components of the difference signal D$b$ (with a specific mixing ratio) to the difference signal D$a$ is obtained as output from the adder 33$a$, and is supplied by way of an output terminal 41$a$ and the aforementioned equalizer 17$a$ to the angle modulator 18$a$. Similarly, a signal resulting from the addition of the low-frequency band of components of the difference signal D$a$ (with a specific mixing ratio) to the difference signal D$b$ is obtained as output from the adder 33$b$, and is supplied by way of an output terminal 41$b$ and the aforementioned equalizer 17$b$ to the angle modulator 18$b$.

The mixing ratio of the mixer 37 can be adjusted by the variable resistor 39. The resistance selected will cause the interference distortion in the demodulated signal to be a minimum. The sound image localization of the reproduced sound field will not be greatly impaired.

The lower frequency band of components having a degree of correlation, which is conducive to interference distortion, is elevated and obtained from the adders 33$a$ and 33$b$. There is almost no interference distortion when the angle-modulated waves from the above mentioned angle modulators are recorded and reproduced.

In the above described embodiment the low-frequency band signal components, which have been filtered by the above mentioned low-pass filters 34$a$ and 34$b$, sometimes a high degree of correlation depending on the kind of signals. There is little tendency for interference distortion from the first, even when the above mentioned mixing is not carried out to a great extent. In such a case, therefore, it is not always desirable to mix with a constant mixing ratio, as in the above described embodiment.

Figure 4:
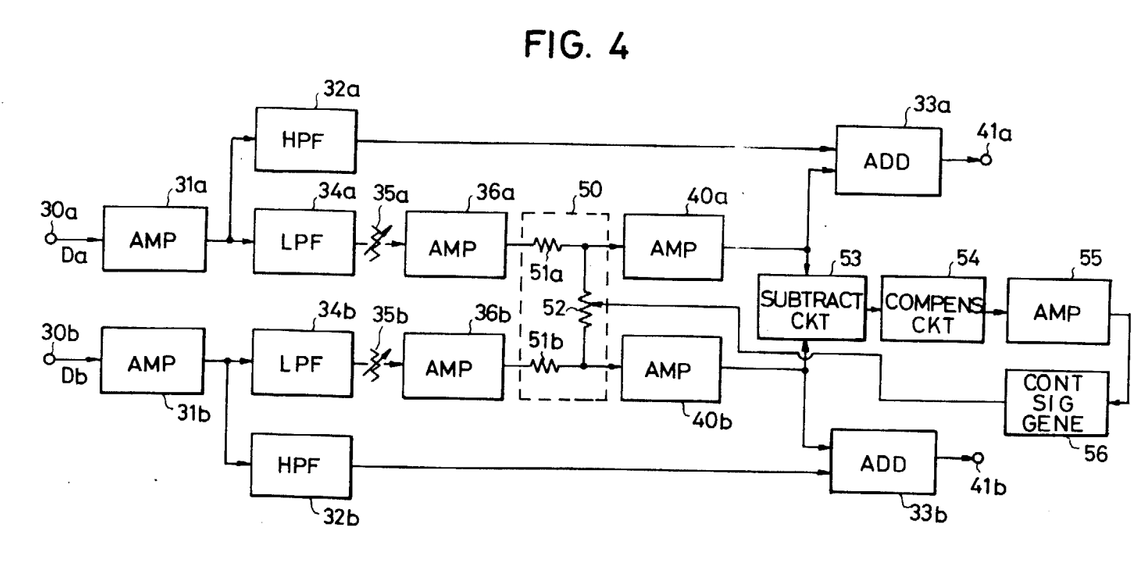
FIG. 4 is a block diagram of a second embodiment of the signal processing circuit portion.

Accordingly, next to be described is the block diagram of a second embodiment (FIG. 4) of the signal processing circuit 16. In FIG. 4, blocks which are the same as corresponding blocks in FIG. 3 are designated by like reference numerals, and detailed description of these blocks will be omitted.

The low-frequency band of components of the difference signals D$a$ and D$b$ (from the amplifiers 36$a$ and 36$b$) are mutually and crosswisely mixed with each other. An appropriate mixing ratio is used in mixer 50, in a manner similar as to the mixing in the mixer 37, and thereafter the mixed signals are fed to the amplifiers 40$a$ and 40$b$. The mixer 50 comprises resistors 51$a$ and 51$b$ and a variable resistor 52, whose resistance value is varied responsive to a control signal from a control signal generating circuit 56 described hereinafter.

The output signals of the amplifiers 40$a$ and 40$b$ are respectively supplied to the adders 33$a$ and 33$b$ and to a subtraction circuit 53. From this subtraction circuit 53, a signal is produced corresponding to the difference between the levels of the signals from the amplifiers 40$a$ and 40$b$, and is fed to a compensation circuit 54. The compensation circuit 54 has a frequency response characteristic corresponding to the standard modulation frequency versus modulation index characteristic of the angle modulators 18$a$ and 18$b$. The circuit 54 effects a weighting of the modulation index, with respect to the output signal from the subtraction circuit 53.

The output signal of the compensation circuit 54 is amplified by an amplifier 55. Thereafter, it is supplied to control signal generating circuit 56, which thereupon forms a control signal. This control signal is fed to the variable resistor 52 of the mixer 50, to vary the resistance value thereof and thereby to vary the mixing ratio.

If there is a high degree of correlation between the two input modulation waves from the amplifiers 36$a$ and 36$b$ to the mixer 50, the output signal of the subtraction circuit 53 is small. The mixer 50 is so controlled that the mixing ratio becomes small, responsive to the control signal from the control signal generating circuit 56. On the other hand, if there is a low degree of correlation between the two input modulation waves to the mixer 50, the output signal of the subtraction circuit 53 is large. The mixer 50 is so controlled that the mixing ratio becomes large, responsive to the control signal.

Figure 5:
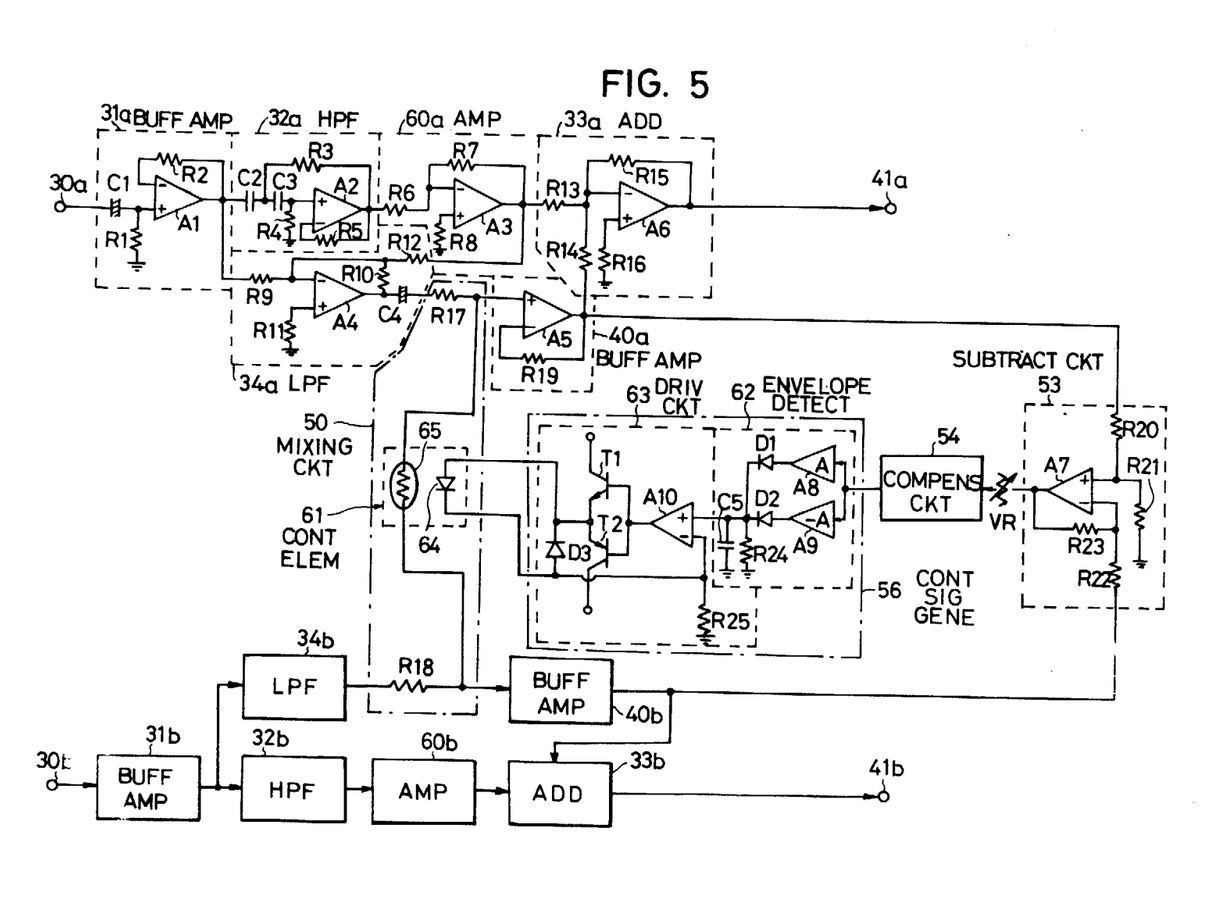
FIG. 5 is a circuit diagram showing one embodiment of specific circuit for use in FIG. 4.

One embodiment (FIG. 5) of a specific circuit will now be described. In FIG. 5, those circuit parts which are the same as or equivalent to the blocks in FIG. 4 are surrounded by intermittent line enclosures, which are designated by respectively like reference numerals. The are provided in pairs and designated by the same reference numerals, but differentiated by respective subscripts $a$ and $b$. The paired blocks are indentical. Only the blocks designated by the reference numerals with the subscript $a$ are shown. Those blocks of the subscripts $b$ are not shown.

The difference signal D$a$ enters through the input terminal 30$a$ and is passed through the buffer amplifier 31$a$ comprising resistors R1 and R2, and an amplifier A1. The signal is then supplied, respectively, to the high-pass filter 32$a$ comprising capacitors C2 and C3, resistors R3, R4, and R5, and an amplifier A2. The signal is also supplied to the low-pass filter 34$a$ comprising resistors R9 through R12, a capacitor C4, and an amplifier A4. These filter circuits make a band division. The transfer function G$_H$(X) of the high-pass filter 32$a$ can be expressed by the following equation:

$$G_H(X) = \frac{X^2}{X^2 + \sqrt{2}\, X + 1},$$

where $$X = j\frac{\omega}{\omega_o}$$

The transfer function G$_l$(X) of the low-pass filter 34$a$ can be expressed as follows:

$$G_L(X) = 1 - G_H(X) = \frac{\sqrt{2}\, X + 1}{X^2 + \sqrt{2}\, X + 1}$$

The output signal of the high-pass filter 32$a$ is supplied through a phase inversion amplifier circuit 60$a$ (comprising resistors R6, R7, and R8 and an amplifier A3) to the adder 33$a$ (comprising resistors R13 through R16 and an amplifier A6). The output signal of the low-pass filter 34$a$ is supplied through a mixing resistor R17 to the buffer amplifier 40$a$. (The mixer 50 comprises the resistor R17, a resistor R18, and a variable resistance element 61.) The buffer amplifier 40$a$ comprises a resistor R19 and an amplifier A5 also supplied by way of the resistor 17 and the variable resistance element 61 to the buffer amplifier 40$b$. The output signal of the low-pass filter 34$b$ is also supplied by way of the resistor R18 to the buffer amplifier 40$b$ and, at the same time, by way of the resistor R18 and the variable resistance element 61 to the buffer amplifier 40a.

The output signal of the buffer amplifier 40a is fed to the adder 33a and, at the same time, is fed through a resistor R20 to the subtraction circuit 53. The subtraction circuit comprises the resistor R20, resistors R21, R22, and R23, and an amplifier A7. Similarly, the output of the buffer amplifier 40b is fed to the adder 33b and, at the same time is fed through the resistor R22 to the subtraction circuit 53.

When the signals supplied from the buffer amplifiers 40a and 40b to the subtraction circuit 53 are of the same phase and same level, the output of the subtraction circuit 53 becomes zero. On the other hand, when there is a phase difference and a level difference between these two signals from the buffer amplifiers 40a and 40b, a signal corresponding to these differences is produced as output by the subtraction circuit 53. This output of the subtraction circuit 53 is supplied by way of a variable resistor VR for setting the level of the compensation circuit 54. Circuit 54 compensates for the frequency response characteristic of the multichannel disc recording.

The output signal of the compensation circuit 54 is supplied to the control signal generation circuit 56. Circuit 56 includes an envelope detector 62 comprising an in-phase output amplifier A8, an opposite-phase output amplifier A9, diodes D1 and D2, a resistor R24,. A capacitor C5 and a variable resistance element driving circuit 63 comprises a resistor R25, an amplifier A10, transistors T1 and T2, and a diode D3. When the output signal of the subtraction circuit 53 is large, a large control signal current is led out from the control signal generation circuit 56.

The variable resistance element 61 of the mixer 50 comprises a so-called photo coupler comprising a light-emitting or electroluminescent diode 64. The luminous intensity of diode 64 is control by a control signal current from the control signal generation circuit 56. A variable resistance controlled element 65 has a resistance which is varied in accordance with the light from the light-emitting diode 64. When the control signal current becomes large, the resistance of the variable resistance 65 becomes small. The mixing ratio of the mixing circuit 50 becomes large.

The mixing quantity becomes large when the output signal of the low-pass filter 34b is of opposite phase and of the same level, with respect to the output signal of the low-pass filter 34a. Moreover, the levels of their respective output signals are high in the low-frequency band. As a consequence, irrespective of the phases of the difference signals Da and Db applied to the input terminals 30a and 30b, the difference signals led out of the output terminals 41a and 41b are controlled automatically. They become the same phase, with an increase in the signal level in the low-frequency band.

If the control signal current increases to the variable resistance element 61, and, as a consequence, the resistance value of the variable resistance controlled element 65 becomes a value close to zero, the mixing quantity in the mixer 50 becomes large. At the time of maximum mixing, the difference signal level of each of the channels in the low-frequency band decreases 6 dB, as a result of the mixing in the mixer 50.

The above mentioned impairment of the channel separation due to the effecting of mixing will now be considered analytically. The separation S(dB) between the different channels can be expressed as follows:

$$S(dB) = 20 \log \left| \frac{\beta}{2 - \beta} \right|$$

Here $\beta = BR/(1 + BR)$, where BR is the mixing ratio of the signals in the mixer 50.

Accordingly, as one example, when a signal exists in only the first channel CH1, the second, third, and fourth channels CH2, CH3, and CH4 are zero. Then, BR = 1 (maximum mixing). The separation of the four channel signals is obtained after demodulation by a demodulator. An operation is 9.5 dB between the first and second channels, between the first and third channels, and between the first and fourth channels. In general, the signal component of the low-frequency band does not have a very important function relative to sound image localization. For this reason, if a separation of substantially 9.5 dB can be substantially secured, there will be practically no problem of the impairment of the separation.

Figure 6:
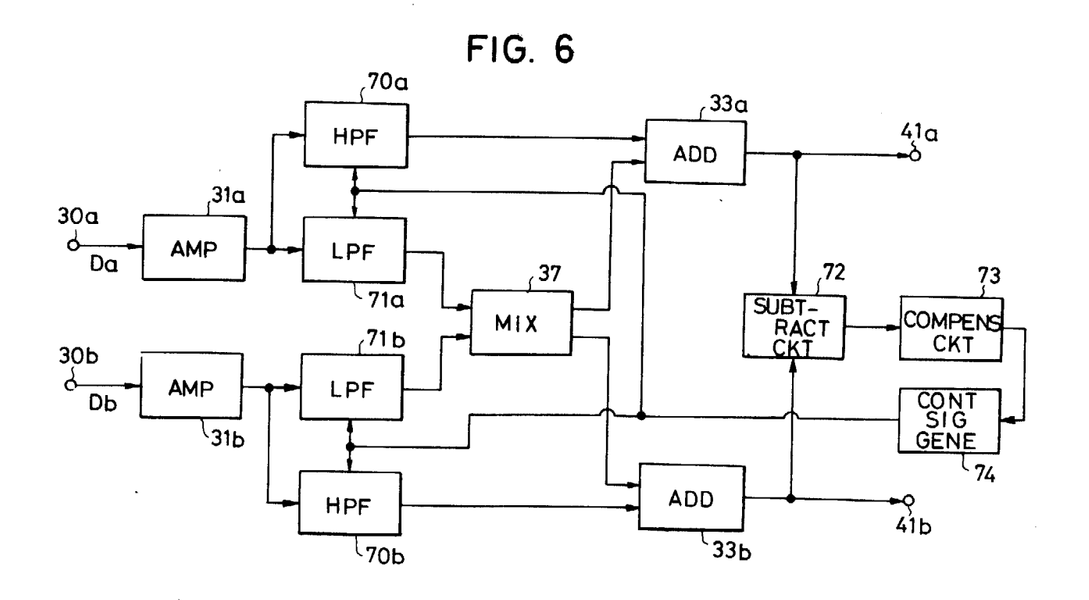
FIG. 6 is a block diagram of a third embodiment of the signal processing circuit portion.

Next, the block diagram (FIG. 6) of a third embodiment of the signal processing circuit 16 will be described. In FIG. 6, the blocks which are the same as or equivalent to corresponding blocks in FIG. 3 are designated by like reference numerals, and their description will be omitted.

The output difference signals of the amplifiers 31a and 31b are respectively fed to a high-pass filter 70a and a low-pass filter 71a and to a high-pass filter 70b and a low-pass filter 71b. The filtering band of cut-off frequencies fc are variably controlled by a control signal described hereinafter. The low-frequency band components passing through the low-pass filters 71a and 71b are supplied to the mixer 37. After being mixed with an appropriate mixing ratio as described hereinbefore in the first embodiment, these components are respectively supplied to the adders 33a and 33b to be respectively added with signals filtered by the high-pass filters 70a and 70b.

The resulting output signals of the adders 33a and 33b are respectively led out through output terminals 41a and 41b and, at the same time, are respectively supplied to a subtraction circuit 72. The difference component of the two signals from the adders 33a and 33b is detected in the subtraction circuit 72. The output signal of circuit 72 is supplied by way of a frequency characteristic compensation circuit 73 to a control signal generation circuit 74, from which an output control signal is produced as output. These subtraction circuit 72, compensation circuit 73, and control signal generation circuit 74 respectively correspond to the subtraction circuit 53, compensation circuit 54, and control signal generation circuit 56 in the above described second embodiment.

The cut-off frequencies fc of the high-pass filter 70a and the low-pass filter 71a and of the high-pass filter 70b and the low-pass filter 71b are respectively variably controlled by the control signal from the control signal generation circuit 74. Here, each filter is so controlled that its cut-off frequency fc becomes high, as the output of the subtraction circuit 72 increases. Consequently, the output signal from the subtraction circuit 72 becomes large, if there is a low degree of correlation of the frequency band signal components which are conducive to interference distortion of the modulation difference signals Da and Db. The difference signals are supplied to the input terminals 30a and 30b. The four filters 70a, 71a, 70b, and 71b are controlled by the control signal from the control signal generation circuit 74, whereby their cut-off frequencies fc become high. As a result, the frequency bands of the signals processed in the mixer 37 increase. The degree of correlation between the signals obtained from the output terminals 41a and 41b becomes high.

Figure 7A:
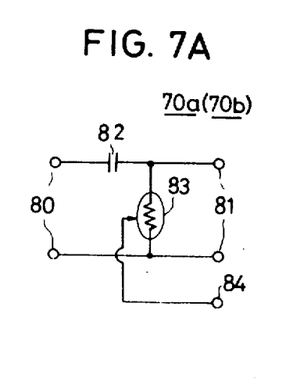
FIGS. 7A and 7B are circuit diagrams respectively showing examples of filter circuits, each suitable for use in the filter circuits shown in FIG. 6.
Figure 7B:
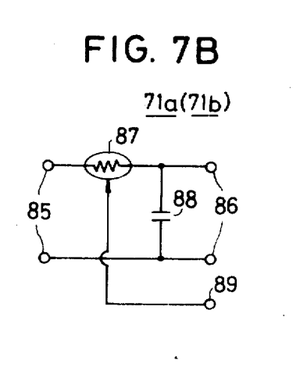

For the above mentioned high-pass filters 70a and 70b, a circuit (FIG. 7A) can be used wherein a capacitor 82 and a variable resistance element 83 are connected as shown with respect to input terminals 80 and output terminals 81. The resistance value of the variable resistancce element 81 is varied by the control signal supplied from the control signal generation circuit 74 through a control signal input terminal 84. Furthermore, for the above mentioned low-pass filters 71a and 71b, a circuit (FIG. 7B) can be used wherein a variable resistance element 87 and a capacitor 88 are connected as shown with respect to input terminals 85 and output terminals 86. The resistance value of the variable resistance element 87 is varied by the control signal supplied through a control signal input terminal 89. For the above mentioned variable resistance element 83 and 87, an element can be used such as a so-called photo coupler comprising a field effect transistor, a transistor and photo coupler comprising a light-emitting diode and cadmium sulfide (CdS).

In the above described embodiment, the output of the adders 33a and 33b are introduced as input into the subtraction circuit 72. An arrangement may also be used wherein the two outputs of the mixer 37 are introduced as input into the subtraction circuit 72.

The system of the present invention is applicable not only to multichannel record disc recording systems but also to other systems such as multichannel broadcasting systems and multichannel magnetic recording and reproducing systems.

Further, this invention is not limited to these embodiments but variations and modifications may be made without departing from the scope and spirit of the invention.

What is claimed is:

1. An angle-modulated signal transmission system comprising:
   a plurality of transmission path means for respectively transmitting angle-modulated signals;
   means for supplying to said transmission path means at least first and second modulation signals;
   first filtering means for filtering, from the first and second modulation signals, predetermined signal components in a band of predetermined frequencies which are conducive to a generation of interference distortion during transmission and thereafter during demodulation, the interference being caused by crosstalk between the angle-modulated signals;
   second filtering means for filtering, from the first and second modulation signals, signal components in a band of frequencies which are other than said predetermined frequencies;
   means for mixing with each other, and with a specific mixing ratio, the predetermined signal components of the first and second modulation signals thus filtered by the filtering means;
   means for adding the predetermined signal components of the first and second modulation signals thus processed by the mixing means, with the signal components of the first and second modulation signals thus filtered by the second filtering means; and
   means for respectively angle modulating carriers responsive to the first and second modulation signals thus processed by the mixing means and adding means, and for supplying the resulting angle-modulated output signals to the respective transmission path means.

2. An angle-modulated signal transmission system as claimed in claim 1 in which the mixing means comprises a variable resistance means for mixing, with a specific mixing ratio, the predetermined frequency band of signal components from the first modulation signal with the corresponding signal components of the second modulation signal, and to mix, with the specific mixing ratio, the predetermined certain frequency band of signal components from the second modulation signal with the corresponding signal components of the first modulation signal.

3. An angle-modulated signal transmission system as claimed in claim 1 and subtraction means responsive to the mixing means for producing an output according to the difference between the signal components, and means responsive to the output of the subtraction means for generating a control signal, and means responsive to said control signal for causing said mixing means to vary the mixing ratio.

4. An angle-modulated signal transmission system as claimed in claim 3 in which the mixing ratio varying means comprises a variable resistance element controlled in accordance with the control signal.

5. An angle-modulated signal transmission system as claimed in claim 3 in which the angle modulation means has a specific modulation index - modulation frequency characteristic, and compensation means responsive to the output of the subtraction means for imparting a frequency response characteristic corresponding to the modulation index - modulation frequency characteristic and for thereafter supplying the resulting output to the means for generating the control signal.

6. An angle-modulated signal transmission system as claimed in claim 1 and subtraction means responsive to the first and second modulation signals, processed by the mixing means, for producing an output according to the difference between the two signals; and means responsive to the output of the subtraction means for generating a control signal, and said first and second filtering means respectively comprising means responsive to the control signal for varying the filtering frequency bands thereof.

7. An angle-modulated signal transmission system as claimed in claim 6 in which said means for varying the filtering frequency bands comprises a variable resistance element controlled in response to the control signal.

8. An angle-modulated signal transmission system as claimed in claim 6 in which the angle modulation means has a specific modulation index - modulation characteristic, and compensation means responsive to the output of the subtraction means for imparting a frequency response characteristic corresponding to the modulation index - modulation frequency characteristic and for thereafter supplying the resulting output thereof to the means for generating the control signal.

9. An angle-modulated signal transmission system comprising:

first and second transmission path means for respectively transmitting first and second angle-modulated signals;

means for supplying first and second modulation signals to said first and second transmission path means respectively;

means comprising first and second low-pass filtering means and first and second high-pass filtering means for filtering the first and second modulation signals, respectively, into low-frequency and other frequency bands of signal components, said low band being conducive to a generation of interference distortion;

means for mixing, with a specific mixing ratio, the resulting output of the first low-pass filtering means with the resulting output of the second low-pass filtering means to produce a first mixed output signal, and for mixing, with a specific mixing ratio, the output of the second low-pass filtering means with the output of the first low-pass filtering means to produce as a second mixed output signal;

first and second adding means for adding the output of the first high-pass filtering means and the first mixed output signal, and for adding the output of the second high-pass filtering means and the second mixed output signal; and first and second angle modulators responsive to the output signals of the first and second adding means for angle modulating to produce as said first and second angle-modulated signals and to supply the same to the first and second transmission path means, the first and second angle modulators having a large modulation index, with respect to frequencies of the low band of the modulation signals.

* * * * *